United States Patent
Saito et al.

(10) Patent No.: US 7,849,375 B2
(45) Date of Patent: Dec. 7, 2010

(54) SEMICONDUCTOR TEST SYSTEM

(75) Inventors: Fumihiro Saito, Musashino (JP); Naoki Miyazaki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 374 days.

(21) Appl. No.: 12/128,057

(22) Filed: May 28, 2008

(65) Prior Publication Data

US 2008/0301512 A1 Dec. 4, 2008

(30) Foreign Application Priority Data

May 29, 2007 (JP) ............................. 2007-141931

(51) Int. Cl.
*G06F 11/00* (2006.01)
(52) U.S. Cl. ...................... 714/736; 714/738
(58) Field of Classification Search ............... 324/537, 324/158.1, 763, 765; 714/719, 736, 738
See application file for complete search history.

(56) References Cited

U.S. PATENT DOCUMENTS 5,101,153 A * 3/1992 Morong, III ................ 324/537
7,114,108 B2 * 9/2006 Park et al. ................... 714/719
7,508,191 B2 * 3/2009 Roberts ...................... 324/158.1
7,679,390 B2 * 3/2010 Matsumoto et al. ......... 324/763
7,692,441 B2 * 4/2010 Matsumoto et al. ......... 324/765

FOREIGN PATENT DOCUMENTS

JP 2003-167031 A 6/2003
JP 2003-196999 A 7/2003

OTHER PUBLICATIONS

Korean Office Action issued Aug. 26, 2009.

* cited by examiner

*Primary Examiner*—David Ton
(74) *Attorney, Agent, or Firm*—Sughrue Mion, PLLC

(57) ABSTRACT

A semiconductor test system includes: pin electronics ("PE") cards each being operable to: a) apply a test pattern to device under tests ("DUTs") each connected to the PE cards; b) capture patterns outputted in response to the test pattern from the DUTs; c) compare the patterns with an expected value pattern; and d) determine whether or not the patterns correspond with the expected value pattern, and a fail control card being operable to: e) aggregate fail information about the DUTs inputted through the PE cards every the DUTs; and f) transfer the fail information to the PE cards.

5 Claims, 4 Drawing Sheets

SEMICONDUCTOR TEST SYSTEM

This application is based on and claims priority from Japanese Patent Application No. 2007-141931, filed on May 29, 2007, the entire contents of which are hereby incorporated by reference.

BACKGROUND

1. Technical Field

The present disclosure relates to a semiconductor test system, and particularly to improvements in match detection in which an expected value pattern is compared and collated with an output pattern and then the presence or absence of match between the patterns is detected.

2. Background Art

In a kind of semiconductor test system, there is a system constructed so as to perform match detection. In the match detection, a given test pattern is applied to a device under test (hereinafter referred to as DUT) from a pin electronics (hereinafter called PE) card, then a pattern outputted from the DUT in response to the test pattern is compared with an expected value pattern, and then the presence or absence of a match between these patterns is detected. A pass/fail of the DUT is determined based on a result of the match detection.

FIG. 4 is a block diagram showing a configuration example of a main part in a semiconductor test system according to the related art. A plurality of PE cards 11 to 13 are provided in the semiconductor test system. Pattern generation parts 21 to 23 and match detection parts 31 to 33 are respectively provided in each of the PE cards 11 to 13.

The PE card 11 applies a test pattern to DUTs 1 to 3 from the pattern generation part 21 and also captures patterns outputted from the DUTs 1 to 3 in response to the test pattern. The PE card 12 applies a test pattern to DUTs 3 and 4 from the pattern generation part 22 and also captures patterns outputted from the DUTs 3 and 4 in response to the test pattern. The PE card 13 applies a test pattern to DUTs 5 and 6 from the pattern generation part 23 and also captures patterns outputted from the DUTs 5 and 6 in response to the test pattern.

The match detection parts 31 to 33 provided in each of the PE cards 11 to 13 perform match detection. In the match detection, by using fail information aggregated every DUT in each of the PE cards 11 to 13, output patterns of each of the DUTs are compared and collated with expected value patterns in response to the test patterns outputted from the respective pattern generation parts 21 to 23 and then the presence or absence of match between the patterns is detected.

Based on a match detection result of each of the match detection parts 31 to 33, pattern sequencers (not shown) provided in the pattern generation parts 21 to 23 of each of the PE cards 11 to 13 decide a branch direction of an internal conditional branch command for setting and instructing an expected value pattern or a test pattern to be next outputted in accordance with a test sequence.

JP-A-2003-196999 discloses a semiconductor test system in which a test pattern is applied to a DUT, then a pattern outputted from the DUT in response to the test pattern is compared with an expected value pattern and then the presence or absence of match between these patterns is detected.

By the way, in the block diagram of FIG. 4, the DUT 3 is connected so as to give and receive a signal to and from two systems of the PE card 11 and the PE card 12. In such a test environment, there is a possibility that match detection results of the match detection parts 31 and 32 provided in the PE card 11 and the PE card 12 are different from each other and either of the output patterns of the DUT 3 does not match with an expected value pattern.

When the match detection results of the match detection parts 31 and 32 provided in the PE card 11 and the PE card 12 are different from each other, the pattern sequencers provided in the pattern generation parts 21 and 22 of each of the PE cards 11 and 12 execute mutually different conditional branch commands and instruct different branch directions. In this case, the pattern generation parts 21 and 22 apply different test patterns to the DUT 3, and thus match detection functions of the match detection parts 31 and 32 cannot be performed.

SUMMARY

Exemplary embodiments of the present invention provides a semiconductor test system in which a match detection function can be performed even when a DUT is connected so as to give and receive a signal to and from a plurality of PE cards.

According to one or more aspects of the present invention, a semiconductor test system comprises:

pin electronics ("PE") cards each being operable to:
  a) apply a test pattern to device under tests ("DUTs") each connected to the PE cards;
  b) capture patterns outputted in response to the test pattern from the DUTs;
  c) compare the patterns with an expected value pattern; and
  d) determine whether or not the patterns correspond with the expected value pattern, and a fail control card being operable to:
  e) aggregate fail information about the DUTs inputted through the PE cards every the DUTs; and
  f) transfer the fail information to the PE cards.

According to one or more aspects of the present invention, each of the PE cards comprises a match detection part for comparing the patterns outputted from the DUTs with the expected value pattern and then determining whether or not the patterns correspond with the expected value pattern.

According to one or more aspects of the present invention, the fail control card comprises a match detection part for comparing the patterns outputted from the DUTs with the expected value pattern and then determining whether or not the patterns correspond with the expected value pattern.

According to one or more aspects of the present invention, each of the PE cards comprises a selection means for selecting the fail information necessary for match detection from either fail information which is not aggregated before sending to the fail control card or fail information aggregated by the fail control card.

According to one or more aspects of the present invention, in a method of testing DUTs, the method comprises:
  i) applying a test pattern to the DUTs;
  ii) capturing patterns outputted in response to the test pattern from the DUTs;
  iii) aggregating fail information about the DUTs every the DUTs;
  iv) comparing the patterns with an expected value pattern using the aggregated fail information; and
  v) determining whether or not the patterns correspond with the expected value pattern.

Consequently, a match detection function can be performed even when a DUT is connected so as to give and receive a signal to and from a plurality of PE cards.

Other aspects and advantages of the invention will be apparent from the following description, the drawings and the claims.

DETAILED DESCRIPTION

Figure 1:
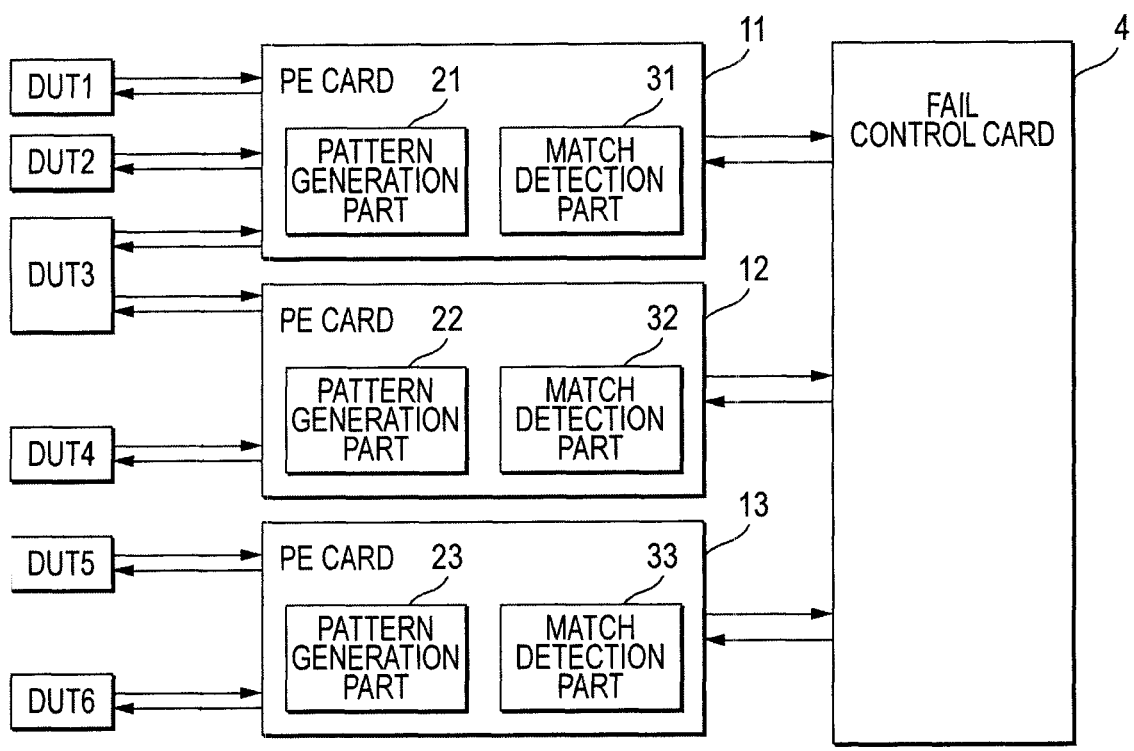
FIG. 1 is a block diagram showing an example of a semiconductor test system according to the present invention.
Figure 4:
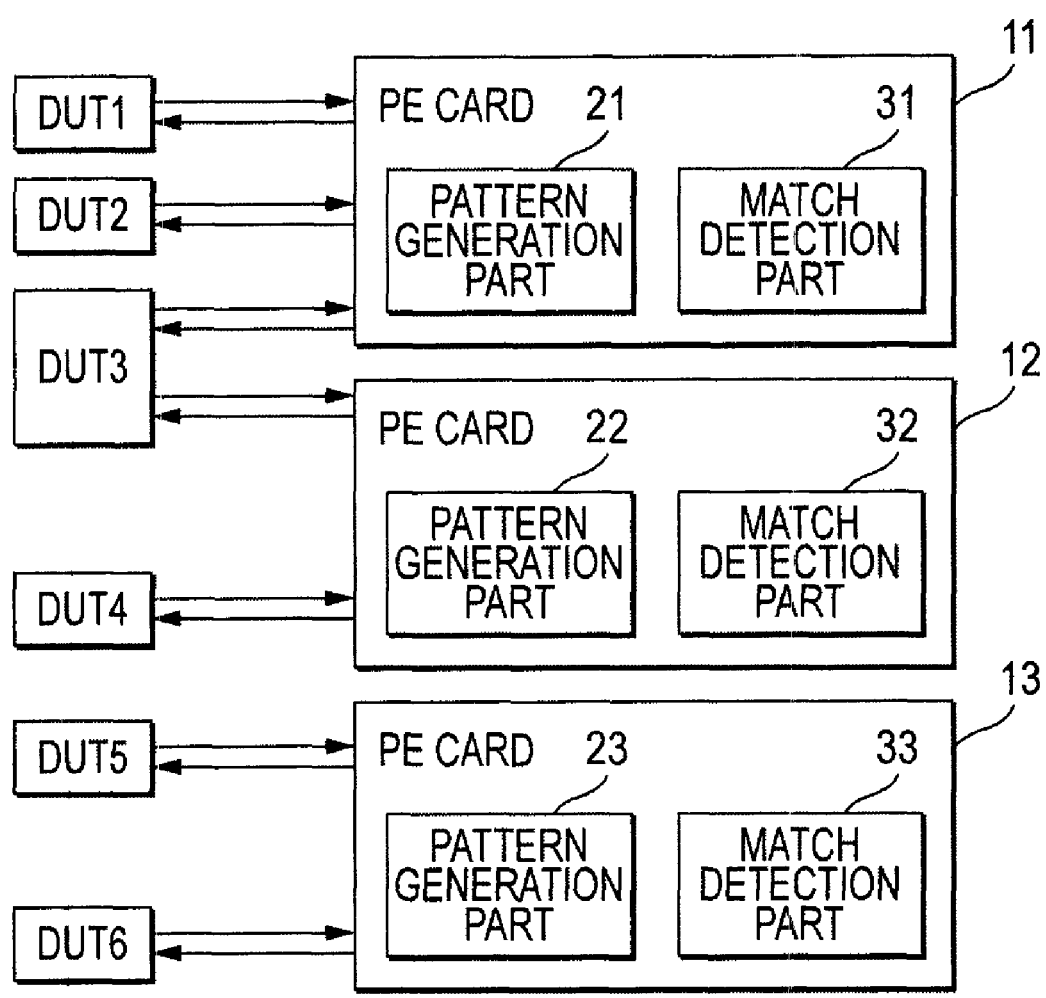
FIG. 4 is a block diagram showing a configuration of a semiconductor test system according to the related art.

Exemplary embodiments of the present invention will be described with reference to the drawings hereinafter. FIG. 1 is a block diagram showing an example of a semiconductor test system according to the present invention. In FIG. 1, the same numerals are assigned to the portions common to FIG. 4. In FIG. 1, a fail control card 4 aggregates fail information inputted through a plurality of PE cards 11 to 13 every DUTs 1 to 6, and then transfers the fail information to the PE cards 11 to 13.

An operation of the semiconductor test system of FIG. 1 will be described as follows:

1) The PE cards 11 to 13 apply a test pattern to the DUTs 1 to 6 each connected to the PE cards 11 to 13, then capture patterns outputted from the DUTs 1 to 6 in response to the test pattern, and then compare the patterns with an expected value pattern. Thus, passes/fails of the DUTs 1 to 6 are determined.

2) The PE cards 11 to 13 transfer fail information about each of the DUTs 1 to 6 to the fail control card 4.

3) The fail control card 4 aggregates the fail information about each of the DUTs 1 to 6 received from the PE cards 11 to 13 every each of the DUTs 1 to 6. In the example of FIG. 1, the DUT 3 gives and receives a signal over the PE card 11 and the PE card 12, so that the fail information about the DUT 3 received from the PE card 11 and the PE card 12 is aggregated.

4) The fail control card 4 transfers the aggregated fail information to the PE cards 11 to 13.

5) Match detection parts 31 to 33 of the PE cards 11 to 13 perform match detection using the aggregated fail information received from the fail control card 4.

In such a configuration, even when only one of the output patterns of the DUT 3, which is connected so as to give and receive a signal to and from two systems of the PE card 11 and the PE card 12, does not match with an expected value pattern, a match detection result in the match detection part 31 of the PE card 11 is equal to that in the match detection part 32 of the PE card 12.

Therefore, pattern sequencers provided in pattern generation parts 21 and 22 of each of the PE cards 11 and 12 execute the same conditional branch command and instruct the same branch direction. In this case, the pattern generation parts 21 and 22 apply the same test pattern to the DUT 3 and thus match detection functions of the match detection parts 31 and 32 can be performed.

Figure 2:
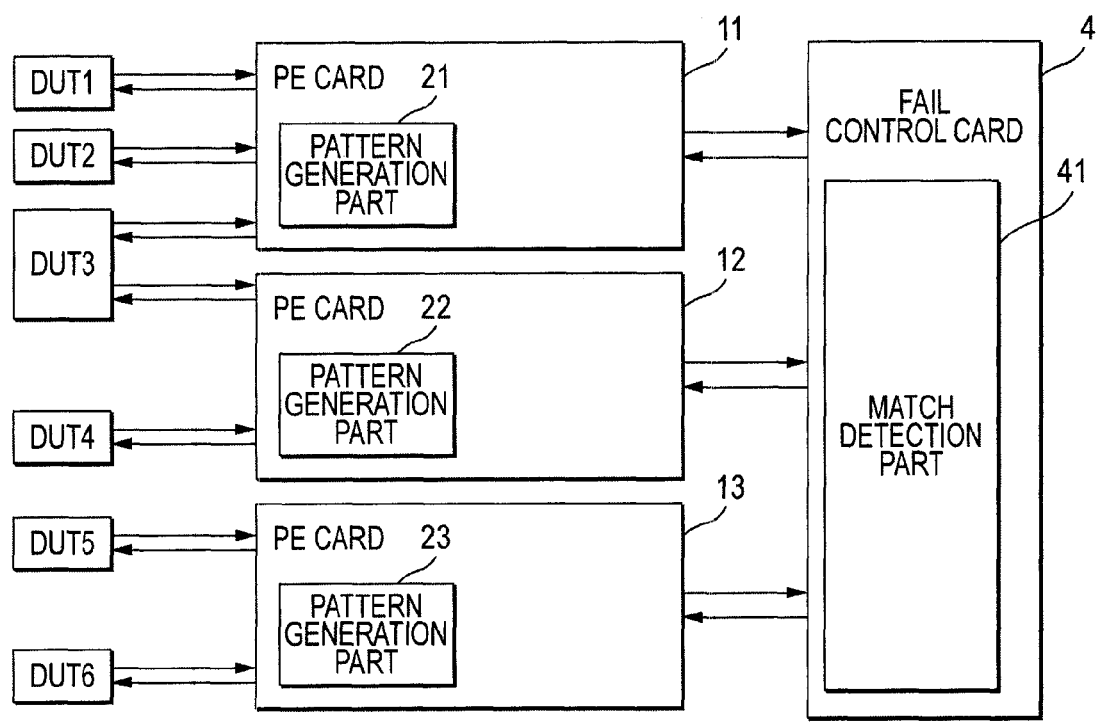
FIG. 2 is a block diagram showing another example of a semiconductor test system according to the present invention.

FIG. 2 is a block diagram showing another example of a semiconductor test system according to the present invention. In FIG. 2, the same numerals are assigned to the portions common to FIG. 1. In FIG. 2, the match detection parts 31 to 33 provided in the PE cards 11 to 13 are removed and a match detection part 41 is implemented in a fail control card 4.

The match detection part 41 detects match detection results every DUTs 1 to 6 and then transfers the match detection results to PE cards 11 to 13.

Consequently, a match detection function can be performed even when the DUT is connected to a plurality of PE cards in a manner similar to the configuration of FIG. 1.

Figure 3:
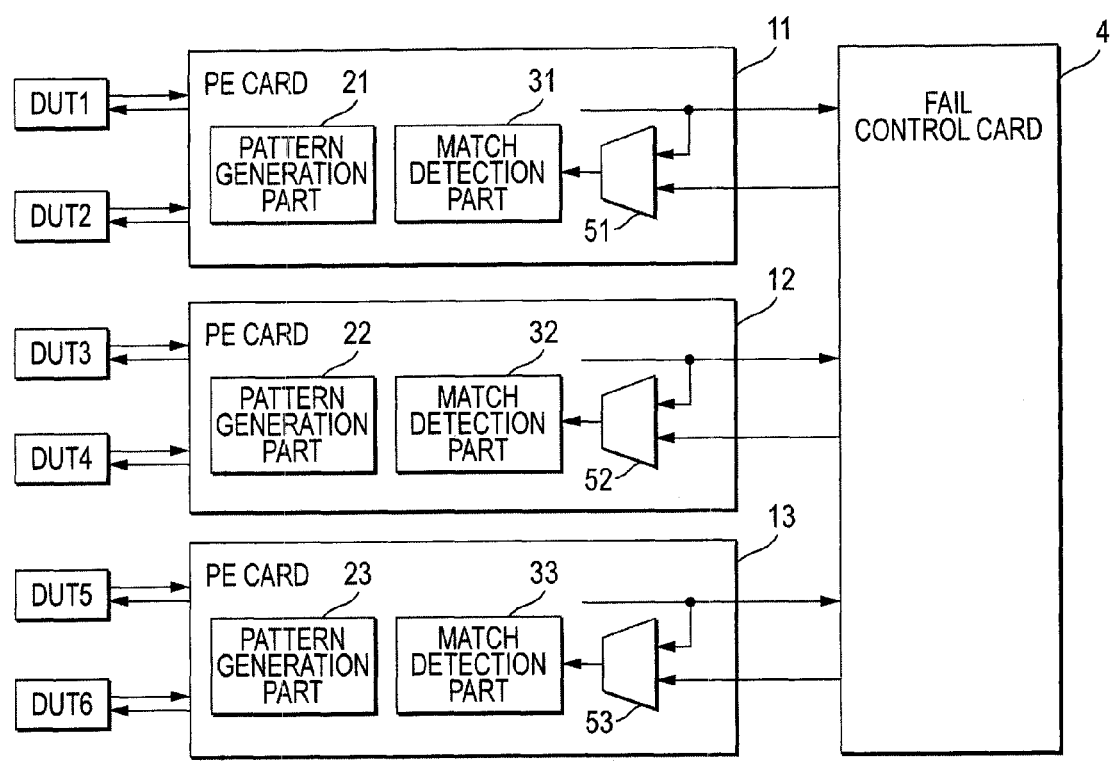
FIG. 3 is a block diagram showing a still another example of a semiconductor test system according to the present invention.

Further, FIG. 3 is a block diagram showing a still another example of a semiconductor test system according to the present invention. In FIG. 3, the same numerals are assigned to the portions common to FIG. 1. In FIG. 3, switching circuits 51 to 53 are provided in PE cards 11 to 13 in addition to pattern generation parts 21 to 23 and match detection parts 31 to 33. Moreover, the switching circuits 51 to 53 are constructed so that control can be performed from the outside of the PE cards 11 to 13.

The switching circuits 51 to 53 select fail information necessary for match detection in each of the match detection parts 31 to 33 from the following two systems 1) or 2).

1) Fail information aggregated by a fail control card 4

2) Fail information which is not aggregated before sending to the fail control card 4

As shown in FIG. 3, when a DUT is not connected over a plurality of PE cards, by selecting 2), a match detection operation can be executed without being influenced by a data transfer rate between the PE cards 11 to 13 and the fail control card 4.

Also, by selecting 2), the following a) to c) time can be eliminated and it is possible to reduce time necessary to perform match detection processing.

a) time necessary to transfer fail information from the PE cards 11 to 13 to the fail control card 4;

b) time necessary for the fail control card 4 to perform aggregation processing of fail information; and c) time necessary to transfer the aggregated fail information from the fail control card 4 to the PE cards 11 to 13.

When the DUT is connected to a plurality of PE cards, by selecting 1), the fail information aggregated by the fail control card 4 is received and processing similar to that of FIG. 1 is performed.

As a configuration of FIG. 3, the fail information necessary for match detection in each of the match detection parts 31 to 33 is selected by using the switching circuits 51 to 53 based on a connection relation between the DUTs 1 to 6 and the PE cards 11 to 13. Depending on the connection relation, influence of the data transfer rate between the PE cards 11 to 13 and the fail control card 4 can be avoided and the match detection processing time can be reduced.

In addition, while each of the exemplary embodiments is constructed of six DUTs 1 to 6 and three PE cards 11 to 13 and the DUT 3 is connected so as to give and receive a signal to and from two systems of the PE card 11 and the PE card 12, the present invention is not limited to these numbers and the connection relation, and can also cope with various combinations of the numbers or a wide variety of connection relations.

According to the present invention as described above, a semiconductor test system in which a match detection function can be performed is implemented even when a DUT is connected so as to give and receive a signal to and from plural PE cards.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A semiconductor test system comprising:
    pin electronics ("PE") cards each being operable to:
        a) apply a test pattern to device under tests ("DUTs") each connected to the PE cards;
        b) capture patterns outputted in response to the test pattern from the DUTs;
        c) compare the patterns with an expected value pattern; and
        d) determine whether or not the patterns correspond with the expected value pattern, and
    a fail control card being operable to:
        e) aggregate fail information about the DUTs inputted through the PE cards every the DUTs; and
        f) transfer the fail information to the PE cards.

2. The semiconductor test system of claim 1,
    wherein each of the PE cards comprises a match detection part for comparing the patterns outputted from the DUTs with the expected value pattern and then determining whether or not the patterns correspond with the expected value pattern.

3. The semiconductor test system of claim 1,
    wherein the fail control card comprises a match detection part for comparing the patterns outputted from the DUTs with the expected value pattern and then determining whether or not the patterns correspond with the expected value pattern.

4. The semiconductor test system of claim 3, wherein each of the PE cards comprises a selection means for selecting the fail information necessary for match detection from either fail information which is not aggregated before sending to the fail control card or fail information aggregated by the fail control card.

5. A method of testing DUTs, the method comprising:
    i) applying a test pattern to the DUTs;
    ii) capturing patterns outputted in response to the test pattern from the DUTs;
    iii) aggregating fail information about the DUTs every the DUTs;
    iv) comparing the patterns with an expected value pattern using the aggregated fail information; and
    v) determining whether or not the patterns correspond with the expected value pattern.

* * * * *